May 11, 1926.
J. E. LONG
1,584,108
AUTOMATIC RETAINING VALVE
Original Filed March 1, 1924
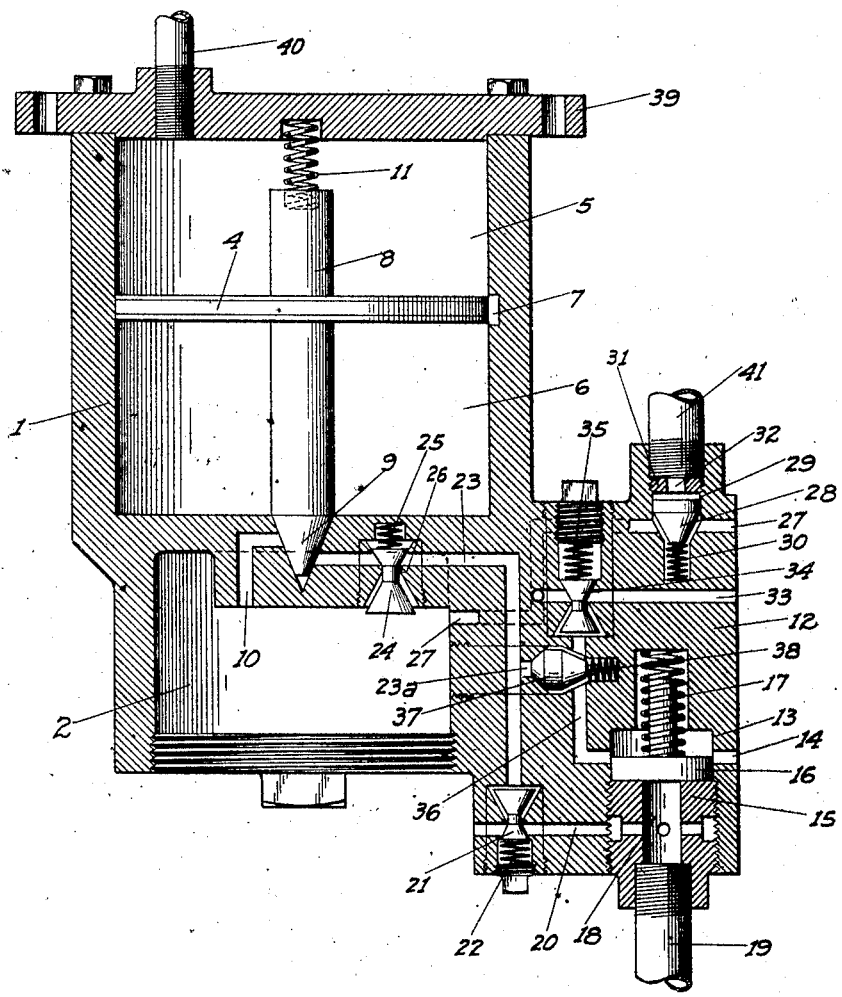
INVENTOR.
John E. Long
BY
ATTORNEY Patented May 11, 1926.

1,584,108

UNITED STATES PATENT OFFICE.

JOHN E. LONG, OF MARYSVILLE, CALIFORNIA, ASSIGNOR OF ONE-THIRD TO I. H. CAPLAN AND ONE-THIRD TO SAMUEL CAPLAN, BOTH OF FRESNO, CALIFORNIA.

AUTOMATIC RETAINING VALVE.

Application filed March 1, 1924, Serial No. 696,380. Renewed December 26, 1925.

This invention relates to the train air brake art and particularly to the brake pressure retaining means used in maintaining brake pressure in the brake cylinders when descending long or frequent grades.

The present invention relates more particularly to an improvement over that type of apparatus shown in my pending application for patent, Serial No. 653,153, filed July 23rd, 1923.

In the present invention I aim to arrange the apparatus so that retained brake pressure may be had with each application of the brakes, if so desired, or by a simple dual brake valve reduction with a lap space between reductions the retained braking pressure may be eliminated or the speed of the train checked without bringing the retained pressure into effect.

These objects I accomplish by a simple arrangement of the valve apparatus with interposed controlling valves whereby the entire operation of the mechanism is controlled directly through the passage of the air through the train pipe and brake apparatus, which brake control mechanism is operable at the will of the engineer through the engineer's valve.

The figure of the drawings is a vertical cross-section of my improved automatic retaining valve.

Referring now more particularly to the characters of reference on the drawings, the main casing of the valve is divided into an upper cylinder 1 and a lower chamber 2 by a partition wall 3. The chamber 2 is of a lesser diameter than the cylinder 1. In the cylinder 1 is a piston 4 dividing the cylinder 1 into two opposite chambers 5 and 6 respectively. When the piston 4 is in normal position, as shown in the drawings a bleed groove 7 provides communication between the chambers 5 and 6. On the piston 4 is a stem 8 terminating at one end in a taper 9 forming the valve for a port 10 leading from the chamber 6 into the chamber 2, as will be hereinafter more particularly described. This valve 9 is normally held seated by a spring 11 interposed between the opposite end of the stem 8 and the end of the cylinder 1.

An enlargement 12 positioned at one side of the main casing of the apparatus is provided with a bore 13 having a bleed port 14 leading from the same, near its inner end, to the atmosphere.

A centrally orificed plug 15 is threaded into the bore 13 to act as a stop for a spring pressed valve 16 so that when the valve 16 is normally closed under the pressure of its spring 17 the said valve 16 will close communication between the bore 18 of the plug 15 and the port 14, at the same time leaving the port 14 partly in communication with the bore 13, for a purpose as will presently appear. The exhaust pipe 19 from the triple valve connects with the bore 18 and a port 20 leads from the bore 18 to the atmosphere. This port 20 is normally closed by a spring pressed valve 21. This valve 21 is of the hour-glass type and the neck thereof is of a smaller diameter than the port 20 so that when said neck is moved into register with said port it will open communication therethrough. The cone of the valve 21 opposite the spring 22 of said valve extends against a port 23 arranged to be in communication with the chamber 6 when the valve 9 is open. This port 23 is controlled and normally held closed by an hour-glass type of spring pressed valve 24. The cone of this valve 24 opposite the cone which is pressed by its spring 25 projects into the chamber 2. The neck of this valve is of a lesser diameter than the port 23 so as to open communication through said port when said neck is moved into register therewith. A small bleed groove 26 leads from the lower set of valve 24 across to the port 23 on the side leading to the valve 21, for the purpose as will hereinafter appear. A port 27 leads from the chamber 2 through the enlargement 12 and to the atmosphere. This port is controlled by a check valve 28 movable in a bore 29 in the enlargement 12. The valve 28 is normally held open by a spring 30. The tension of said spring and the limit of movement of the valve 28 is controlled by an adjusting nut 31 threaded into the bore 29. Said nut 31 has a square central hole 32 serving as a wrench seat and also as a port, as will presently appear. The port 27 has a branch 33, the open and closed position of which is controlled by an hour-glass type of valve 34 normally held in closed position by a spring 35.

The cone of the valve 34 opposite the spring 35 extends against a port 36 arranged in communication with the bore 13. The valve 16 when in normal position under the influence of the spring 17 allows this port 36 to be partly in communication with said bore 13 and can be moved as will appear to close this port with the operation of the mechanism as hereinafter described.

The port 36 is controlled by a valve 37 which is normally held by a spring 38 to maintain the port 36 open. The end of the valve 37 opposite the spring 38 extends against a branch 23ª of the port 23.

In practice the valve is connected into the brake equipment as follows: The valve casing is fastened to the car in any suitable manner but preferably by means of a bracket 39. A short nipple or pipe 40 then connects from the bottom of the triple valve casing carrying train line pressure to the chamber 5. A similar pipe or nipple 41 connects from the brake cylinder to the bore 29, while the pipe 19 connects from the triple valve exhaust port to the bore 18.

In normal inactive position the valve appears as shown in the drawings. I will first proceed to describe the action thereof when retained brake pressure is to be had, and I will later explain how brakes may be applied and retained pressure eliminated.

Describing now the operation for an application of the brakes for retained pressure, it is pointed out that, with the valve in inactive position, the train line pressure within the cylinder 1 is normally equalized on both sides of the piston by reason of the equalizing groove 7.

When the engineer desires retained brake pressure he moves his valve to make the usual reduction in the train line pressure. This movement reduces the pressure in the chamber 5 and hence the greater pressure in the chamber 6 acts against the piston 4 to lift the stem 8 and open the valve 9. The port 23, being closed by the spring pressed valve 24, pressure in the chamber 6 passes through the port 10 into the chamber 2. This pressure within the chamber 2 then acts against the valve 24 to move it against the spring 25 and open the port 23.

The pressure from the brake cylinder passes through the pipe 41 into the bore 29 and acts against the valve 28 to close the port 27 and trap the air pressure within the chamber 2.

The engineer, if he desires retained pressure, then moves his valve to release position. The exhaust through the triple valve then passes through the pipe 19 and into the bore 18 and port 20 where it is blocked against release to the atmosphere by the valve 21. This pressure then raises the valve or plunger 16 against its spring 17. This action opens the ports 36 and 14. A part of the pressure then moves through the port 36 and past the valve 37, which is held open by its spring 38 and acts against the valve 34, raising it against its spring 35 to open the port 33, whereupon the pressure in chamber 2 is released through the ports 27 and 33 to the atmosphere. The rest of the pressure of the exhaust escapes through the port 14 until the pressure is reduced to a point below the resistance of the spring 17, which gives any desired amount of retained pressure. When this point is reached the spring 17 closes the valve 16 and the retained pressure is held in the brake cylinder by the tension of the spring 17.

When the engineer returns his valve to release position the pressure of the train line again increases and through the medium of the pipe 40 such pressure is admitted to the chamber 5 and becomes equalized on both sides of the piston 4 by means of the groove 7, as has been described.

The pressure from the chamber 2 having been released the valve 24 also again closes.

If the engineer desires to make a further application of the brakes and still maintain his retained pressure he repeats the above operation when the mechanism operates as just described.

To eliminate retained pressure or to check the train without retaining any pressure, the engineer makes a dual reduction of the train line pressure, moving his valve to lap position between each reduction, and then moves his valve to release position. This causes the following operations of the various mechanisms of my valve to take place. With the first train line reduction the pressure in the chamber 5 becomes less than in the chamber 6. The greater pressure in the chamber 6 then acts against the piston 4 to lift the stem 8 and open the valve 9. The pressure in the chamber 6 then moves through the port 10 into the chamber 2, opening the valve 24 in the manner previously described. As has already been described the brake pressure closes the valve 28 and traps the pressure in the chamber 2. While the engineer's brake valve is on lap position the train pipe pressure again equalizes in chambers 5 and 6.

When the engineer makes the next train line reduction the valve 9 is again unseated in the manner already described and further pressure passes by the valve 9 into the chamber 2. This time, however, the valve 24 is open and pressure also passes into the port 23 and into its branch 23ª. This pressure closes the valve 37 across the port 36 and moves the valve 21 to open communication from the port 20 to the atmosphere.

Now when the engineer releases his brakes the exhaust from the triple valve passes through the pipe 19 into the bore 18 and to the atmosphere through the port 20. Even if a portion of this pressure should act against the valve 16 and escape into the port 36 it cannot act to open the valve 34 for the reason that the port 36 is blocked by the valve 37 held closed by the pressure in the port 23, which same pressure is holding the valve 21 open. The pressure in the chamber 2 is also blocked so as to hold all the parts in the position just described.

When all the pressure has escaped from the brake cylinder to the atmosphere through the medium of the pipe 19, bore 18 and port 20 this releases the pressure against the valve 28 through the pipe 41 and the spring 30 then acts to open said valve 28 and allows the escape of the pressure in the chamber 2 to the atmosphere, allowing valve 24 to seat across 23 whereupon the pressure in the port 23 bleeds past the groove 26 into the chamber 2 and thence to the atmosphere through the port 27. All valves then return to normal position under the influence of their respective springs. Pressure, if any, remaining in the port 36 will bleed therefrom into the bore 13 and out the port 14, as will be obvious.

From the foregoing description it will readily appear that I have provided a simple and efficient valve whereby the normal braking operations of a train may be carried on without the valve interfering therewith and yet one in which the valve may be automatically brought into operation to provide a retained brake pressure when so desired.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A normally closed retaining valve, for air brake systems, means whereby with each consecutive application and release of the brakes a predetermined brake pressure will be retained, and means whereby the retained pressure may be eliminated by a dual train line pressure reduction without an intermediate restoration of such pressure.

2. A normally closed retaining valve for air brake systems, and means for opening the valve with a dual reduction of train line pressure, without an intermediate restoration of such pressure.

3. A normally closed retaining valve for air brake systems, means for opening the valve with a dual reduction of train line pressure without an intermediate restoration of such pressure, and means for allowing the valve to return to closed position when the train line pressure is restored.

4. A normally closed retaining valve for air brake systems, means for opening the valve with fluid pressure, means for trapping the fluid pressure within the valve casing to hold the valve open, and means for releasing the trapped pressure.

5. A normally closed retaining valve for air brake systems, means for applying and holding fluid pressure against the valve to open it, means for releasing such pressure, and means whereby the applying and holding means may be rendered inactive.

6. A normally closed retaining valve for air brake systems and means operable by fluid pressure for permitting the valve to remain closed during consecutive applications and releases of the brakes.

7. A normally closed retaining valve for air brake systems and means operable by fluid pressure for permitting the valve to remain closed during consecutive applications and releases of the brakes, but operable to open position upon a dual train line pressure reduction being made with no intermediate restoration of such pressure.

8. A retaining valve mechanism for air brake systems including a valve proper, means for admitting and trapping fluid pressure within the mechanism, means controlled by the trapped pressure for thereafter admitting the entry of a further pressure within the mechanism and against the valve to open the same, and means for releasing the pressures and allowing the valve to close.

9. A normally closed retaining valve, means for admitting fluid pressure against the valve to open same, means for trapping such pressure to hold the valve open, and means for releasing the trapped pressure.

10. A valve casing provided with a port for communicating with the exhaust outlet of an air brake cylinder, a valve normally closing said port, a means within the casing for admitting fluid pressure against the valve to open same, means normally closing said pressure admission means, and means operable by fluid pressure for opening the same.

11. A valve casing provided with a port for communicating with the exhaust outlet of an air brake cylinder, a valve normally closing said port, the casing having a second port terminating adjacent said valve, a normal closure for said second port, means for opening said closure, and means whereby fluid pressure may be admitted to the second port to act against the first named valve to open same.

12. A valve casing provided with a port for communicating with the exhaust outlet of an air brake cylinder, a valve normally closing said port, the casing having a second port terminating adjacent said valve, a normal closure for said second port, means for opening said closure, means whereby fluid pressure may be admitted to the second port to act against the first named valve to open same, and means for trapping the pressure within the second port to hold said first named valve open.

13. A valve casing provided with a port for communicating with the exhaust outlet of an air brake cylinder, a valve normally closing said port, the casing having a second port terminating adjacent said valve, a normal closure for said second port, means for opening said closure, means whereby fluid pressure may be admitted to the second port to act against the first named valve to open same, means for trapping the pressure within the second port to hold said first named valve open, and means for releasing such trapped pressure.

14. A normally closed retaining valve for air brake systems, and means whereby consecutive applications and releases of the brakes can be had with the valve in closed position.

15. A normally closed retaining valve for air brake systems, means whereby consecutive applications and releases of the brakes can be had with the valve in closed position, means for trapping fluid pressure within the valve casing, and means for utilizing the trapped pressure to open the valve at will.

16. A normally closed retaining valve, the valve casing having a port terminating adjacent the valve, a second valve normally closing said port, and means for opening said second valve to allow fluid pressure to be admitted to the port.

17. A normally closed retaining valve, the valve casing having a port terminating adjacent the valve, a second valve normally closing said port, means for opening said second valve to allow fluid pressure to be admitted to the port, and means for closing the port to trap the pressure therein.

18. A normally closed retaining valve, the valve casing having a port terminating adjacent the valve, a second valve normally closing said port, means for opening said second valve to allow fluid pressure to be admitted to the port, means for closing the port to trap the pressure therein, and means for releasing the trapped pressure.

19. A normally closed retaining valve, the valve casing having a port terminating adjacent the valve, a second valve normally closing said port, means for admitting pressure against said second valve to open same, and means for then admitting pressure to the port to open the first valve.

20. A normally closed retaining valve, the valve casing having a port terminating adjacent the valve, a second valve normally closing said port, means for admitting pressure against said second valve to open same, means for then admitting pressure to the port to open the first valve, and means for trapping the pressure in the port.

21. A normally closed retaining valve, the valve casing having a port terminating adjacent the valve, a second valve normally closing said port, means for admitting pressure against said second valve to open same, means for then admitting pressure to the port to open the first valve, means for trapping the pressure in the port, and means for releasing the trapped pressure.

22. A normally closed retaining valve, the valve casing having a chamber and a port leading to the chamber and a port terminating adjacent the valve, a spring pressed hour glass valve normally closing the second port and having one cone projecting into the chamber, and means for admitting fluid pressure to the chamber to open the second valve and then admit pressure to the port.

23. A normally closed retaining valve, the valve casing having two spaced chambers and a port leading from one chamber to the other and a port leading from the first chamber to a point adjacent the valve, a second valve normally closing said ports, means for opening and closing the second valve to admit fluid pressure to the second chamber and said second named port, a third valve normally closing the second port, and means whereby the pressure in the chamber will open said third valve.

24. A normally closed retaining valve, the valve casing having two spaced chambers and an inlet from the outside into the first chamber, the casing having a port communicating from the first to the second chamber and a second port communicating from the first chamber to a point adjacent the valve, a second valve to control communication through said ports, a third valve normally closing the second port and having a part projecting into the second chamber whereby pressure in the second chamber will act thereagainst to open the valve, the casing having a third port with two branches each leading to the atmosphere, a valve in each branch, one normally open and the other normally closed, the casing having a fourth port adjacent the normally open valve and a fifth port adjacent the normally closed valves and each leading to outside the casing.

25. A normally closed retaining valve, the valve casing having two spaced chambers and an inlet from the outside into the first chamber, the casing having a port communicating from the first to the second chamber and a second port communicating from the first chamber to a point adjacent the valve, a second valve to control communication through said ports, a third valve normally closing the second port and having a part projecting into the second chamber whereby pressure in the second chamber will act thereagainst to open the valve, and the casing having a third port with two branches each leading to the atmosphere, a valve in each branch, one normally open and the other normally closed, the casing having a fourth port adjacent the normally open valve and a fifth port adjacent the normally closed valves and each leading to outside the casing, and a valve in the fifth port having one end projecting into the second port whereby pressure in the second port will operate the valve to close the fifth port.

26. A normally closed retaining valve for air brake systems and means, operable and controlled by the fluid pressures present in the system, for permitting the valve to remain closed when the train line pressure is consecutively reduced and restored.

27. A normally closed retaining valve for air brake systems and means, operable and controlled by the fluid pressures present in the system, for permitting the valve to remain closed when the train line pressure is consecutively reduced and restored, but to move same to open position when the train line pressure is twice reduced with no intermediate restoration of such pressure.

28. A normally closed retaining valve for air brake systems, means for opening the valve with train line pressure, and means controlled by the triple valve exhaust pressure for rendering the latter means inoperative when train line pressure is consecutively reduced and restored.

29. A normally closed retaining valve for air brake systems, means controlled by train line pressure for opening the valve, means controlled by triple valve exhaust pressure for rendering the first means inoperative when the train line pressure is consecutively reduced and restored, and means likewise controllable by train line pressure for rendering the second means inoperative upon the train line pressure being twice reduced with no intermediate restoration of such pressure.

30. A normally closed retaining valve for air brake systems, means operable by train line pressure for opening the valve upon the train line pressure being twice reduced with no intermediate restoration of such pressure, and means operable by the triple valve exhaust pressure for rendering the first means inoperative upon a consecutive reduction and restoration of the train line pressure.

31. A retaining valve mechanism for air brake systems, including a normally closed valve, means for trapping train line pressure within the mechanism upon the train line pressure being twice reduced with no intermediate restoration of such pressure, and means whereby the trapped pressure will operate to open the valve.

32. A retaining valve mechanism for air brake systems, including a normally closed valve, means controlled by brake cylinder pressure for trapping train line pressure within the mechanism upon the train line pressure being twice reduced with no intermediate restoration of such pressure, and means whereby the trapped pressure will operate to open the valve.

33. A retaining valve mechanism for air brake systems, including a normally closed valve means controlled by brake cylinder pressure for trapping train line pressure within the mechanism upon the train line pressure being twice reduced with no intermediate restoration of such pressure, means whereby the trapped pressure will operate to open the valve, and means controlled by triple valve exhaust pressure for rendering the brake pressure controlled means inoperative to trap said train line pressure when consecutive reductions and releases of said train line pressure are made.

In testimony whereof I affix my signature.

JOHN E. LONG.